(12) United States Patent
Simon

(10) Patent No.: US 6,394,475 B1
(45) Date of Patent: May 28, 2002

(54) TRAILER GUARD

(76) Inventor: Stephan A. Simon, 1071 Dover La., Adams, WI (US) 53910

(*) Notice: Subject to any disclaimer, the term of this patent is extended or adjusted under 35 U.S.C. 154(b) by 0 days.

(21) Appl. No.: 09/628,844

(22) Filed: Jul. 31, 2000

(51) Int. Cl.$^7$ ............................................. B62D 25/18
(52) U.S. Cl. .................. 280/154; 280/848; 280/849; 280/851; 280/847; 248/221.11
(58) Field of Search .................. 280/848, 154, 280/849, 851, 159, 160, 847, 768, 153.5, 152.3, 155; 248/221.11, 222.14, 222.12, 220.21; D12/184, 185; 224/42.31, 518, 519

(56) References Cited

U.S. PATENT DOCUMENTS

| | | | | |
|---|---|---|---|---|
| 2,618,493 A | * | 11/1952 | Fransen, Sr. et al. | 280/768 |
| 2,683,612 A | | 7/1954 | Bacino | 280/851 |
| 2,935,336 A | * | 5/1960 | Case | 280/851 |
| 3,388,884 A | | 6/1968 | Eggler et al. | 248/222.11 |
| 3,877,722 A | * | 4/1975 | Conner | 280/154 |
| 3,934,901 A | * | 1/1976 | Hammerly | 280/851 |
| 4,319,764 A | | 3/1982 | Whitaker | 280/154 |
| 4,627,594 A | * | 12/1986 | Reed | 280/851 X |
| 4,877,266 A | * | 10/1989 | Lamparter et al. | 280/768 X |
| 5,121,944 A | * | 6/1992 | Haddox | 280/851 X |
| D330,692 S | | 11/1992 | Hammond, Jr. | D12/185 |
| 5,269,547 A | | 12/1993 | Antekeier | 280/154 |
| 5,833,254 A | * | 11/1998 | Bucho | 280/154 |
| 5,915,708 A | * | 6/1999 | Silva | 280/154 |
| 5,938,222 A | * | 8/1999 | Huang | 280/154 |
| 6,070,893 A | * | 6/2000 | Thorndyke et al. | 280/768 X |
| 6,116,628 A | * | 9/2000 | Adrian | 280/154 |
| 6,179,311 B1 | * | 1/2001 | Larkin et al. | 280/154 |

FOREIGN PATENT DOCUMENTS

WO    WO 90/02073    3/1990

* cited by examiner

*Primary Examiner*—Robert P. Olszewski
*Assistant Examiner*—F. Zeender

(57) ABSTRACT

A trailer guard is disclosed having a right brush assembly having a right brush support, a right mount, and a left brush assembly having a left brush support and a left mount wherein the right support and the left support are joined by a connector and the right mount and left mount are capable of fixedly and removably engaging the existing vehicle trailer hitch support. The right brush and left brush comprise a plurality of flexible plastic strands capable of deflecting stones and dirt.

6 Claims, 2 Drawing Sheets

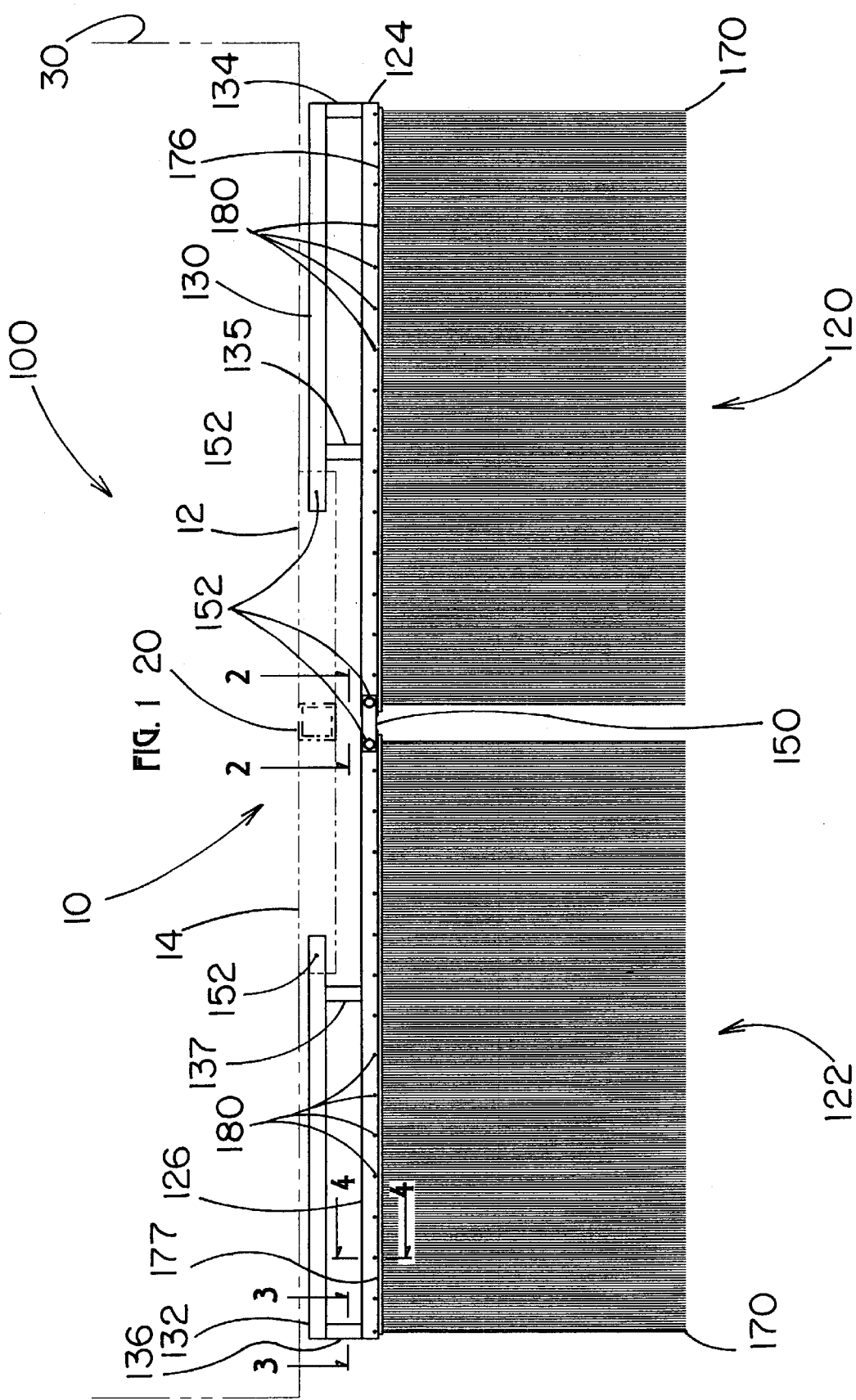

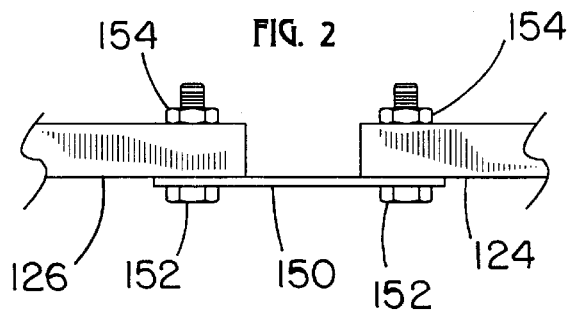
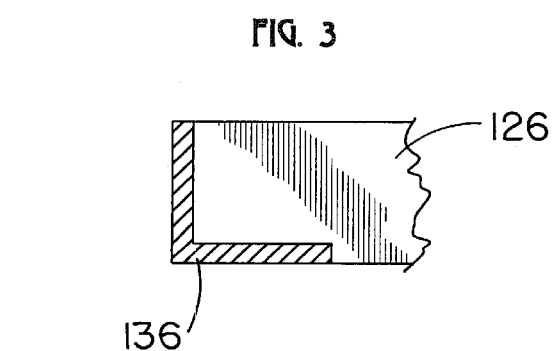
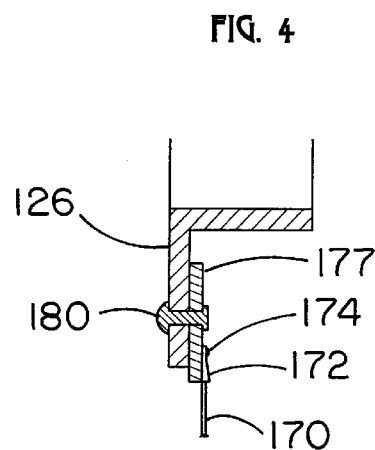
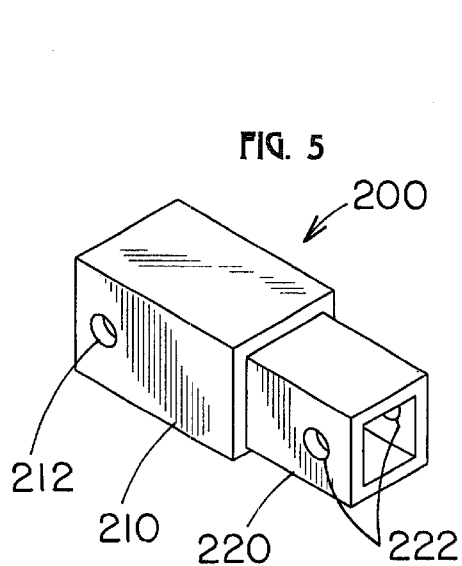
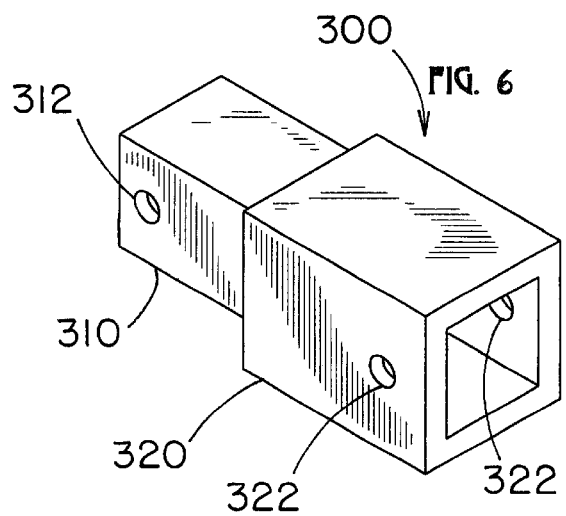

TRAILER GUARD

BACKGROUND OF THE INVENTION

1. Field of the Invention

The present invention relates to an apparatus for protecting a trailer or towed Recreational Vehicle from damage caused by stones or dirt cast up by the tires of the towing vehicle.

2. Description of the Prior Art

The prior art discloses two types of guard devices for preventing stones and dirt from being cast by vehicle tires. The first type of guard device consists of mud guards or mud flaps that are affixed to the vehicle directly in line behind the tires so that stones or dirt cast by the tires will be deflected by the guard. Normally, the guards are made of rubber or other durable and flexible material. U.S. Pat. No. 4,319,764 discloses a mud flap mounting device with a horizontal swing arm pivotally mounted on a longitudinal structural member of the vehicle. U.S. Pat. No. 3,388,884 discloses a mud flap attached to a support frame having a vertical leg adapted for sliding engagement in an upwardly open socket. U.S. Pat. No. 2,683,612 discloses removable mud flaps molded with a "T" head for slidable mounting in an open channel permanently affixed under the body of the truck. U.S. Pat. Des. 330,692 discloses a removable mud flap.

The second type of guard device is affixed to the wheel housing and is mounted parallel to the outside of the wheel and perpendicular to the direction of travel. The second type of guard device is used to prevent spray from being cast out from the wheel housing when driving in rain. U.S. Pat. No. 5,269,547 (the '547 patent) discloses a mounting member and a brush adapted for engagement to a vehicle fender. The '547 patent further discloses a spray brush having a plurality of filaments attached to a base and a mounting member having a spray brush holder adapted to be mounted on an elongated rolled edge of a vehicle fender.

What is needed beyond the prior art is a trailer guard that will prevent liquid and objects from being cast by the rear tires of a towing vehicle onto a trailer or recreational vehicle that is being towed behind the vehicle. What is further needed beyond the prior art is a trailer guard that can be installed using the existing trailer mount fixture. Finally, what is needed beyond the prior art is a trailer guard that can be easily installed and removed as desired.

SUMMARY OF THE INVENTION

The present invention meets the needs and solves the problems identified above by providing a trailer guard having a right brush assembly having a right brush support and a right mount, and a left brush assembly having a left brush support and a left mount wherein the right support and the left support are joined by a connector and the right mount and left mount are capable of fixedly and removably engaging the existing vehicle trailer hitch support. The right brush and left brush comprise a plurality of flexible plastic strands capable of deflecting stones and dirt.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 depicts a front view of trailer guard affixed to a vehicle.

FIG. 2 depicts a detail view along line 2—2 of FIG. 1.

FIG. 3 depicts a detail view along line 3—3 of FIG. 1.

FIG. 4 depicts a detail view along line 4—4 of FIG. 1.

FIG. 5 depicts a right side perspective view of a first adapter.

FIG. 6 depicts a right side perspective view of a second adapter.

DESCRIPTION OF PREFERRED EMBODIMENTS

FIG. 1 depicts a view of trailer guard 100 mounted to trailer hitch support 10 of vehicle 30. Trailer hitch support 10 has left hitch support 14, right hitch support 12 and hitch post 20. Right brush assembly 120 has a plurality of strands 170 affixed to right brush plate 176. Right brush plate 176 is affixed to right brush support 124 by a plurality of rivets 180. Right brush assembly 120 has right mount 130 fixedly engaged to right brush support 124 by first right support connector 134 and second right support connector 135. Left brush assembly 122 has a plurality of strands 170 affixed to left brush plate 177. Left brush plate 177 is affixed to left brush support 126 by a plurality of rivets 180. Left brush assembly 122 has left mount 132 fixedly engaged to left brush support 126 by first left support connector 136 and second left support connector 137. Right brush support 124 and left brush support 126 are fixedly engaged by connector 150 and bolts 152. Right mount 130 and left mount 132 are capable of fixedly and removably engaging right hitch support 12 and left hitch support 14 respectively. Strands 170 are positioned sufficiently close together to catch and deflect stones, dirt, objects or liquids thrown up by the tires of vehicle 30. In the preferred embodiment, right mount 130 and left mount 132 are approximately 27" long and are approximately 2 inch by 2 inch square box tubing made of steel or other suitable metal similar in geometry to right hinge support 12 and left hinge support 14. Also, in the preferred embodiment, right brush support 124 and left brush support 126 are approximately 38 ½ inches long. In the preferred embodiment, right mount 130 slides into right hitch support 12 and is secured by bolt 152 and nut 154. Left mount 132 is secured to left hitch support 154 in a similar manner.

FIG. 2 depicts a view along line 2—2 of FIG. 1. Connector 150 is seen fixedly engaged to right brush support 124 and left brush support 126 by bolts 152. Nuts 154 rotatably engage bolts 152 and are tightened to bring connector 150 into contact with right brush support 124 and left brush support 126.

FIG. 3 is a view along line 3—3 of FIG. 1 and shows the "L" shape of first left support connector 136. First left support connector 136 is fixedly engaged to left brush support 126. Although not shown, second left support connector 137 is fixedly engaged to left brush support 126 in the same manner as shown for first left support connector 136. In the preferred embodiment, first left support connector 136 is made of angle iron, steel or other suitable metal, and left brush support 126 is made of angle iron made of steel or other suitable metal. Although not shown, first right support connector 134 and second right support connector 135 are fixedly engaged to right brush support 124 in the same manner as shown for first left support connector 136 in FIG. 3. Likewise, in the preferred embodiment, first right support connector 134 is made of angle iron, steel or other suitable metal, and right brush support 124 is made of angle iron made of steel or other suitable metal. In the preferred embodiment, first right support connector 134, second right support connector 135, first left support connector 136 and second left support connector 137 have legs approximately 1 ¼ inch wide at 90 degree angles to each other.

FIG. 4 is a detail view along line 4—4 of FIG. 1. Strand 170 is affixed to keeper 172. Keeper 172 is affixed to left brush plate 177 by brush plate rivet 174. Left brush plate 177 is affixed to left brush support 126 by rivet 180. As used herein, strand means a flexible fiber or bristle which may be made of plastic or other suitable material.

FIG. 5 depicts first adapter 200. First adapter 200 has first adapter first section 210 and first adapter second section 220. First adapter second section 220 is smaller than first adapter first section 210. First adapter first section 212 is sized for sliding engagement with right mount 130 and left mount 132 so that right mount 130 and left mount 132 can engage right hitch support 12 and left hitch support 14 when right hitch support 12 and left hitch support 14 are smaller than right mount 130 and left mount 132.

FIG. 6 depicts second adapter 300 having a second adapter first section 310 and a second adapter second section 320. Second adapter second section 320 is larger than second adapter firstsection 310. Second adapter first section 310 is sized for sliding engagement with right mount 130 and left mount 132 so that right mount 130 and left mount 132 can engage right hitch support 12 and left hitch support 14 when right hitch support 12 and left hitch support 14 are larger than right mount 130 and left mount 132.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for fixed and removable engagement with a left hitch support and a right hitch support of a vehicle, said apparatus comprising:
    a left brush assembly;
    a right brush assembly; and
    a connector fixedly engaged to said left brush assembly and said right brush assembly;
    wherein said left brush assembly engages said left hitch support and said right brush assembly engages said right hitch support;
    wherein the left brush assembly comprises:
        a left mount;
        a left brush support fixedly engaged to said left mount by a first left support connector and a second left support connector; and
        a left brush plate fixedly engaged to said left brush support and to a plurality of strands; and
    wherein the right brush assembly comprises:
        a right mount;
        a right brush support fixedly engaged to said right mount by a first right support connector and a second right support connector; and
        a right brush plate fixedly engaged to said right brush support and to a plurality of strands.

2. The apparatus of claim 1 further comprising an adapter.

3. A brush assembly for engaging to a hitch support attached to a rear of a vehicle comprising:
    a mount;
    a brush support affixed to said mount by a first support connector and a second support connector;
    a brush plate affixed to said brush support by a plurality of rivets;
    at least one keeper affixed to said brush plate by a brush plate rivet;
    a strand affixed to said keeper; and
    an adapter, wherein said adapter is sized for sliding engagement with said mount and the hitch support.

4. An apparatus for fixed and removable engagement with a left hitch support and a right hitch support of a vehicle, said apparatus comprising:
    a left brush assembly having a left mount and a left brush support fixedly engaged to said left mount by a first left support connector and a second left support connector;
    a left brush plate fixedly engaged to said left brush support and to a first plurality of strands;
    a right brush assembly having a right mount and a right brush support fixedly engaged to said right mount by a first right support connector and a second right support connector;
    a right brush plate fixedly engaged to said right brush support and to a second plurality of strands; and
    a connector fixedly engaged to said left brush assembly and said right brush assembly;
    wherein said left brush assembly engages said left hitch support and said right brush assembly engages said left hitch support.

5. The apparatus of claim 4 further comprising a first adapter.

6. The apparatus of claim 4 further comprising a second adapter.

* * * * *